(12) United States Patent
Luna

(10) Patent No.: US 8,136,825 B2
(45) Date of Patent: Mar. 20, 2012

(54) TUBULAR AXLE BEAM SUSPENSION MOUNT

(75) Inventor: Gonzalo Luna, Lake Orion, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 278 days.

(21) Appl. No.: 12/524,035

(22) PCT Filed: Mar. 4, 2008

(86) PCT No.: PCT/US2008/055761
§ 371 (c)(1),
(2), (4) Date: Jul. 22, 2009

(87) PCT Pub. No.: WO2008/109585
PCT Pub. Date: Sep. 12, 2008

(65) Prior Publication Data
US 2010/0044991 A1 Feb. 25, 2010

Related U.S. Application Data

(60) Provisional application No. 60/893,679, filed on Mar. 8, 2007.

(51) Int. Cl.
*B60G 11/00* (2006.01)
(52) U.S. Cl. .......... 280/124.175; 280/124.174; 301/132; 301/133
(58) Field of Classification Search ............. 280/124.11, 280/124.128, 124.132, 124.153, 124.155, 280/124.17, 124.174, 124.175; 301/132, 301/133
See application file for complete search history.

(56) References Cited

U.S. PATENT DOCUMENTS

| | | | |
|---|---|---|---|
| 1,872,196 A | | 8/1932 | Urschel |
| 3,386,724 A | | 6/1968 | Tantlinger et al. |
| 4,227,716 A | * | 10/1980 | Nordstrom ............. 280/124.175 |
| 4,412,690 A | * | 11/1983 | Prokop et al. ................. 280/686 |
| 4,946,190 A | * | 8/1990 | Buttner ................. 280/124.163 |
| 5,921,570 A | * | 7/1999 | Lie ......................... 280/124.175 |
| 5,950,971 A | * | 9/1999 | Koumbis et al. ............. 248/200 |

(Continued)

FOREIGN PATENT DOCUMENTS

GB 377028 A 8/1932

(Continued)

OTHER PUBLICATIONS

Search Report and Written Opinion mailed on Jun. 24, 2008 for PCT/US2008/055761.

(Continued)

*Primary Examiner* — Toan To
(74) *Attorney, Agent, or Firm* — Carlson, Gaskey & Olds, PC

(57) ABSTRACT

A suspension mount for a vehicle axle includes first and second mount components that are positioned on opposing sides of the axle. A spring is supported by the first and second mount components. The axle is comprised of a tubular beam body that encloses a cavity. The tubular beam body has a fore wall, an aft wall, a top wall, and a bottom wall that bound the cavity. The first mount component is positioned adjacent the fore wall and the second mount component is positioned adjacent the aft wall. At least one fastener extends through the cavity and through the fore and aft walls to secure the first and second mount components to the tubular beam body.

20 Claims, 3 Drawing Sheets

U.S. PATENT DOCUMENTS

| | | | |
|---|---|---|---|
| 6,230,540 B1 | 5/2001 | Wilch et al. | |
| 6,328,324 B1 * | 12/2001 | Fenton | 280/124.163 |
| 6,406,008 B1 * | 6/2002 | Dudding et al. | 267/52 |
| 6,585,331 B2 | 7/2003 | Varela | |
| 7,017,888 B2 | 3/2006 | Platner et al. | |
| 2003/0192185 A1 | 10/2003 | Varela | |
| 2006/0244236 A1 * | 11/2006 | Cortez et al. | 280/124.175 |
| 2008/0258361 A1 | 10/2008 | Wen et al. | |
| 2010/0038877 A1 * | 2/2010 | Cortez et al. | 280/124.175 |
| 2010/0213682 A1 | 8/2010 | Luna | |

FOREIGN PATENT DOCUMENTS

| | | |
|---|---|---|
| JP | 62067339 A | 3/1987 |
| WO | WO 96/36502 A | 11/1996 |
| WO | WO 97/06022 | 2/1997 |
| WO | WO 2007/112576 A | 10/2007 |

OTHER PUBLICATIONS

International Preliminary Report on Patentability dated Sep. 17, 2009.

* cited by examiner

TUBULAR AXLE BEAM SUSPENSION MOUNT

RELATED APPLICATIONS

This application claims priority to U.S. Provisional Application No. 60/893,679 filed on Mar. 8, 2007.

TECHNICAL FIELD

This invention generally relates to a suspension mount for mounting a leaf spring to a tubular axle beam.

BACKGROUND OF THE INVENTION

Different methods have been used to attach leaf springs used on mechanical and air suspensions to tubular axle beams for steer axles. For example, one type of mounting interface utilizes top and bottom axle brackets that are "wrapped" around outer surfaces of the tubular axle beams. A spring top pad sandwiches the leaf spring to these wrap-around brackets with U-bolts.

Another type of mounting interface utilizes the same top and bottom axle brackets that are wrapped around the tubular axle beam with a spring top pad, but instead of using U-bolts, hex built-in features are used. The hex built-in features allow straight bolts to be used to sandwich the leaf spring to the wrap-around axle brackets.

These traditional mount interfaces have certain disadvantages. For example, torque relaxation at a fastener interface can result in loosening of an attachment interface. Also, over-tightening of the fasteners can result in beam deformation. Each of these conditions can result in premature wear or failure at the mount interface.

Further, with a wrap-type mount interface, the bottom wrap is often required to be relatively massive in size in order to accommodate bolt loads. This is disadvantageous from a cost and weight perspective.

Thus, there is a need for a more secure and robust mount interface that overcomes the deficiencies discussed above.

SUMMARY OF THE INVENTION

A suspension mount for a vehicle axle includes first and second mount components that are positioned on opposing sides of the vehicle axle. A spring is supported by the first and second mount components. The vehicle axle is comprised of a tubular beam body that encloses a cavity. The first mount component is positioned adjacent a fore side of the tubular beam body and the second mount component is positioned adjacent an aft side of the tubular beam body. At least one fastener extends through the cavity from the fore side to the aft side to secure the first and second mount components to the tubular beam body.

In one example, the tubular beam body extends in a lateral direction and has a fore wall, an aft wall, a top wall, and a bottom wall that bound the cavity. The fastener is inserted in a longitudinal direction through the cavity and through the fore and aft walls to secure the first and second mount components to the tubular beam body.

In one example, the first and second mount components include respective first and second spring pads. A spring bracket is mounted to the first and second spring pads. At least one leaf spring is secured to the first and second spring pads with the spring bracket. The leaf spring extends in a longitudinal direction that is transverse to the laterally extending tubular beam body. A top plate is secured over the leaf spring and is fastened to the spring bracket and the first and second mount components.

In one example, at least one of the first and second mount components includes an extension portion that extends in a longitudinal direction through one of the fore and aft walls of the tubular beam body. The fastener is inserted into the extension portion. The extension portion has a distal end face that is spaced apart from a mating engagement surface when the fastener is under a first torque load condition. The distal end surface is in abutting contact with the mating engagement surface when the fastener is under a second torque load condition greater than the first torque load condition.

In one example, the first and second mount components comprise first and second axle brackets that each include an extension portion. In this configuration the mating engagement surface comprises a distal end surface of the second extension portion. In another example, only one of the first and second axle brackets includes an extension portion. The mating engagement surface in this configuration comprises an inner wall surface of a wall opposite from a wall through which the extension portion is inserted. In both of these configurations, the first and second spring pads are formed as part of the axle brackets.

In another example, the first mount component comprises a first adaptor and a first axle bracket that are associated with each other, and the second mount component comprises a second adaptor and a second axle bracket that are associated with each other. The first and second spring pads are formed with the first and second axle brackets, and the extension portion is formed on at least one of the first and second adaptors.

The subject suspension mount provides a secure and robust attachment interface for a tubular axle configuration. These and other features of the present invention can be best understood from the following specification and drawings, the following of which is a brief description.

DETAILED DESCRIPTION OF THE PREFERRED EMBODIMENT

Figure 1:
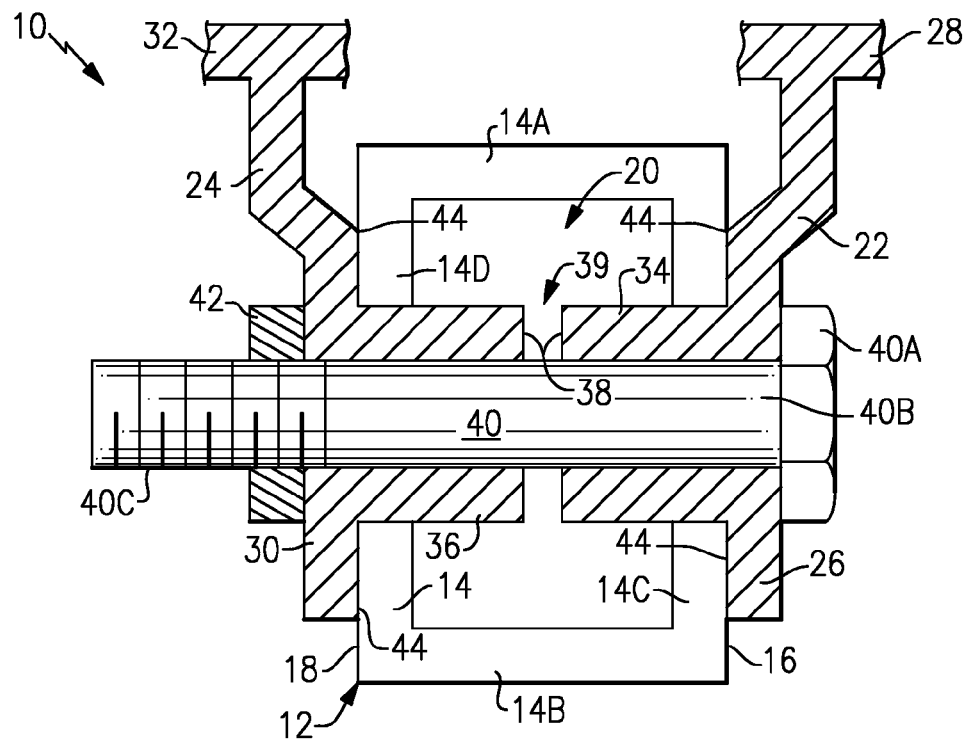
FIG. 1 is a schematic cross-sectional view of one example of a suspension mount.
Figure 6A:
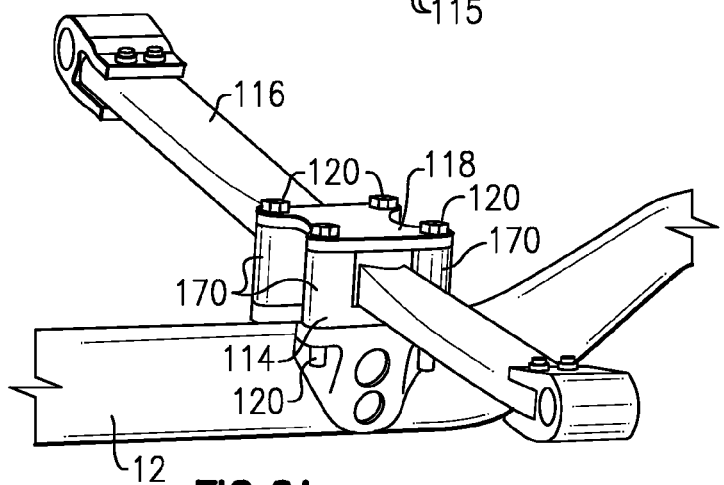
FIG. 6A is a schematic perspective view of a leaf spring mount configuration as used with any of the suspension mounts from FIGS. 1-5.

A suspension mount interface 10 for an axle 12 is shown in FIG. 1. The axle 12 comprises a laterally extending beam or housing member that extends laterally across a vehicle (FIG. 6A). In the examples discussed below, the axle 12 comprises a non-drive steer axle; however, the suspension mount interface 10 could also be used for other types of axles.

The axle 12 includes a tubular beam body 14 that has a fore side 16, facing a forward vehicle direction, and an aft side 18, facing a rearward vehicle direction. The tubular beam body 14 has a top wall 14A, a bottom wall 14B, a fore wall 14C, and an aft wall 14D. The walls 14A-D are configured to form a generally rectangular, box-shape, tubular cross-section; however, other cross-sectional configurations could also be used. The walls 14A-D cooperate to define/bound an internal cavity 20.

The suspension mount interface 10 uses first and second suspension mount components that are positioned on opposing sides of the tubular beam body 14. In one example, one of the first and second suspension mount components is positioned on the fore side 16 and the other of the first and second suspension mount components is positioned on the aft side 18. Each of the first and second suspension mount components is configured to provide support for longitudinally extending spring members, such as leaf springs, for example. In the examples shown in FIGS. 1-2, the first and second suspension mount components comprise first and second axle brackets, respectively. In the examples shown in FIGS. 3-5 the first suspension mount component is comprised of a first adaptor and a first axle bracket, and the second suspension mount component is comprised of a second adaptor and a second axle bracket. In each example, spring pads/supports are formed with the first and second axle brackets. Each of these examples will be discussed in greater detail below.

In the example shown in FIG. 1, the suspension mount interface 10 includes a first axle bracket 22 positioned on the fore side 16 of the tubular beam body 14 and a second axle bracket 24 positioned on the aft side 18 of the tubular beam body 14. In the example shown, the first 22 and second 24 axle brackets are cast components, which are advantageous from a cost and weight standpoint; however the brackets could also be forged or fabricated components for example.

The first axle bracket 22 includes a vertically extending pad 26 that abuts against the fore wall 14C and a longitudinally extending spring pad 28 that is positioned above the top wall 14A. The second axle bracket 24 includes a vertically extending pad 30 that abuts against the aft wall 14D of the tubular beam body 14 and a longitudinally extending spring pad 32 that is positioned above the top wall 14A. The spring pads 28, 32 are shown as being above the top wall 14A; however, the spring pads could be positioned at a different location if needed. This also applies to other embodiments discussed below. A leaf spring is supported on the spring pads 28, 32. This will be discussed in greater detail below.

The first axle bracket 22 includes a first extension 34 that extends in a longitudinal direction through an opening in the fore wall 14C and into the internal cavity 20. The second axle bracket 24 includes a second extension 36 that extends along the longitudinal direction through an opening in the aft wall 14D. The second extension 36 also extends into the internal cavity 20 and is positioned opposite from the first extension 34. As such, the first 34 and second 36 extensions face each other, and each of the first 34 and second 36 extensions include a distal end surface 38. The distal end surfaces 38 are spaced apart from each other by a gap 39 when initially installed. The first 34 and second 36 extensions are received within the fore 14C and aft 14D walls in a loose fit.

The first 34 and second 36 extensions include bores that are aligned to receive a fastener 40. In the example shown, the fastener 40 comprises a bolt having a head portion 40a, a shank portion 40b, and a threaded end 40c that receives a nut 42; however, other types of fastener configurations could also be used. Under a free condition without a fastener torque load, the first 34 and second 36 extensions are separated by the gap 39. A large gap 39 is shown for clarity purposes, it should be understood that the gap 39 would be much narrower when the first 34 and second 36 extensions are in their initial, free conditions.

Under a clamped condition, i.e. with a fastener torque load, the fastener 40 clamps the first 22 and second 24 axle brackets to the tubular beam body 14 such that the end surfaces 38 contact each other to close the gap 39. This prevents the tubular beam body 14 from buckling or being crushed as a result of torque loads applied to the fastener 40.

Another advantage with this configuration is that friction forces (indicated at 44), i.e. bearing forces, are desirably built between the first 22 and second 24 axle brackets and corresponding fore 14C and aft 14D walls of the tubular beam body 14. Also, the configuration provides larger shear areas via the first and second extensions 34, 36 for axle loading. Further, this configuration has a reduced number of mounting components compared to traditional configurations.

Figure 2:
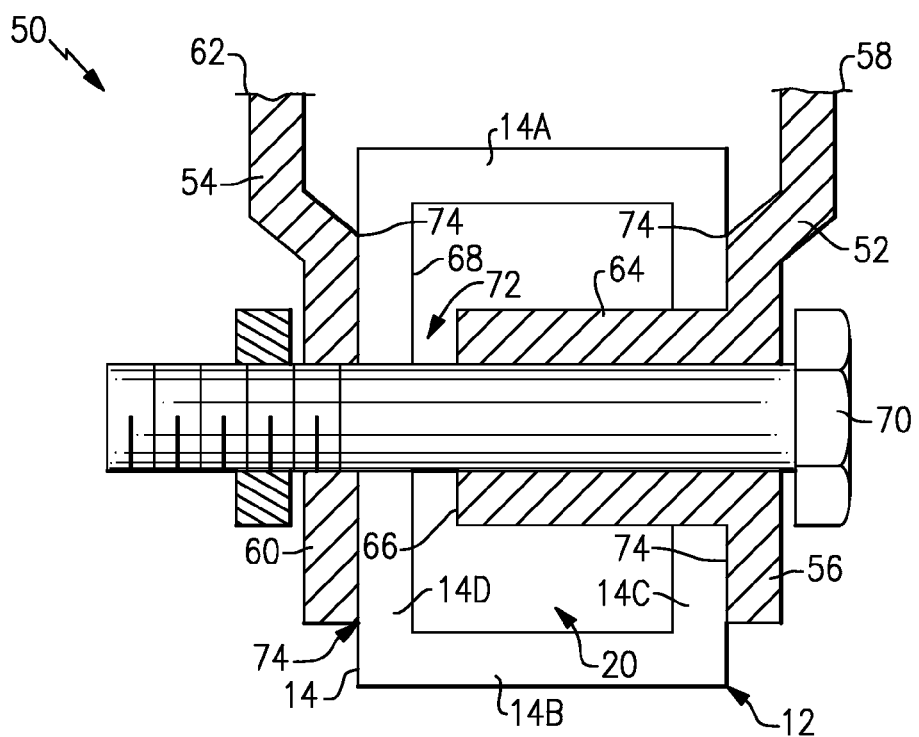
FIG. 2 is a schematic cross-sectional view of another example of a suspension mount.

FIG. 2 shows a configuration similar to that of FIG. 1; however, in this example, only one of the axle brackets includes an extension portion. FIG. 2 shows a suspension mount interface 50 with a first axle bracket 52 positioned on the fore side 16 of the tubular beam body 14 and a second axle bracket 54 positioned on the aft side 18 of the tubular beam body 14. The first 52 and second 54 axle brackets are cast components, which is advantageous from a cost and weight standpoint; however the brackets could be made from other processes as described above. The first axle bracket 52 includes a vertically extending pad 56 that abuts against the fore wall 14C and a longitudinally extending spring pad 58 that is positioned above the top wall 14A. The second axle bracket 54 includes a vertically extending pad 60 that abuts against the aft wall 14D of the tubular beam body 14 and a longitudinally extending spring pad 62 that is positioned above the top wall 14A. A leaf spring is supported on the spring pads 58, 62. This will be discussed in greater detail below.

The first axle bracket 52 includes an extension portion 64 that extends in a longitudinal direction through an opening in the fore wall 14C and into the internal cavity 20. The second axle bracket 54 in this example does not include an extension portion. The extension portion 64 of the first axle bracket 52 is received within the opening in the fore 14C wall in a loose fit. The extension portion 64 has a distal end surface 66 that extends toward an interior surface 68 of the aft wall 14D.

The extension portion 64 includes a bore that receives a fastener 70. In the example shown, the fastener 70 comprises a bolt similar to that of FIG. 1; however, other fastener configurations could also be used. Under an initial installation position, i.e. a free condition without a fastener torque load, the extension portion 64 is separated from an interior surface 68 of the tubular beam body 14 by a gap 72. Again, it should be understood that the gap 72 is exaggerated for clarity purposes. Under a clamped condition, the fastener 70 clamps the first 52 and second 54 axle brackets to the tubular beam body 14 such that the distal end surface 66 contacts the interior surface 68 to close the gap 72. This prevents the tubular beam body 14 from buckling or being crushed as a result of torque loads applied to the fastener 70.

Friction forces (indicated at 74), i.e. bearing forces, are built between the first 52 and second 54 axle brackets and corresponding fore 14C and aft 14D walls of the tubular beam body 14. Also, as with the configuration of FIG. 1, this configuration provides larger shear areas via the extension portion 64 for axle loading. Further, this configuration has a reduced number of mounting components compared to traditional configurations. It should also be understood that the reverse configuration could also be used with the second axle bracket 54 including an extension portion and the first axle bracket 52 not having an extension.

Figure 3:
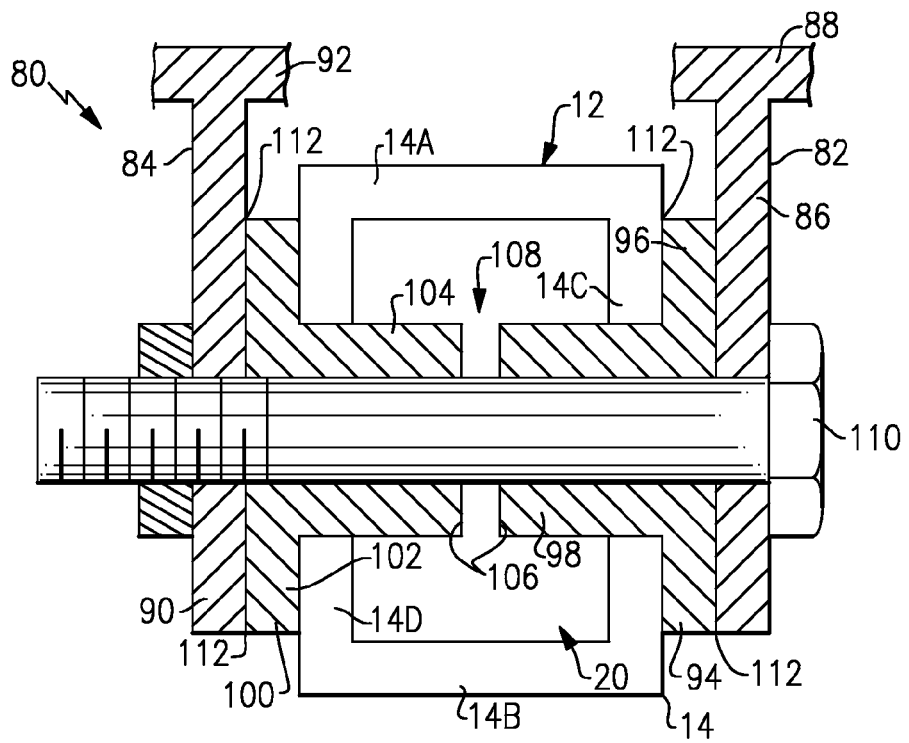
FIG. 3 is a schematic cross-sectional view of another example of a suspension mount.
Figure 4:
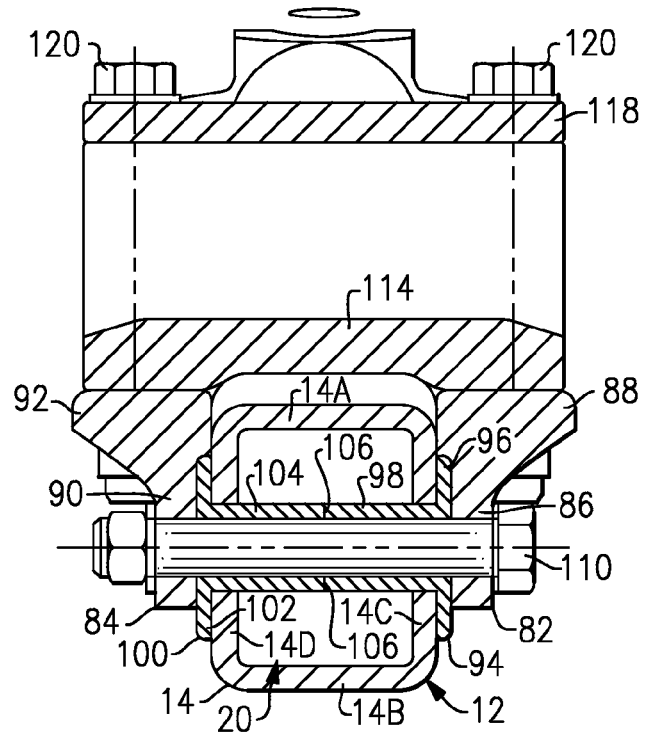
FIG. 4 is a view similar to that of FIG. 3 but shows extension members in abutting contact with each other.
Figure 5:
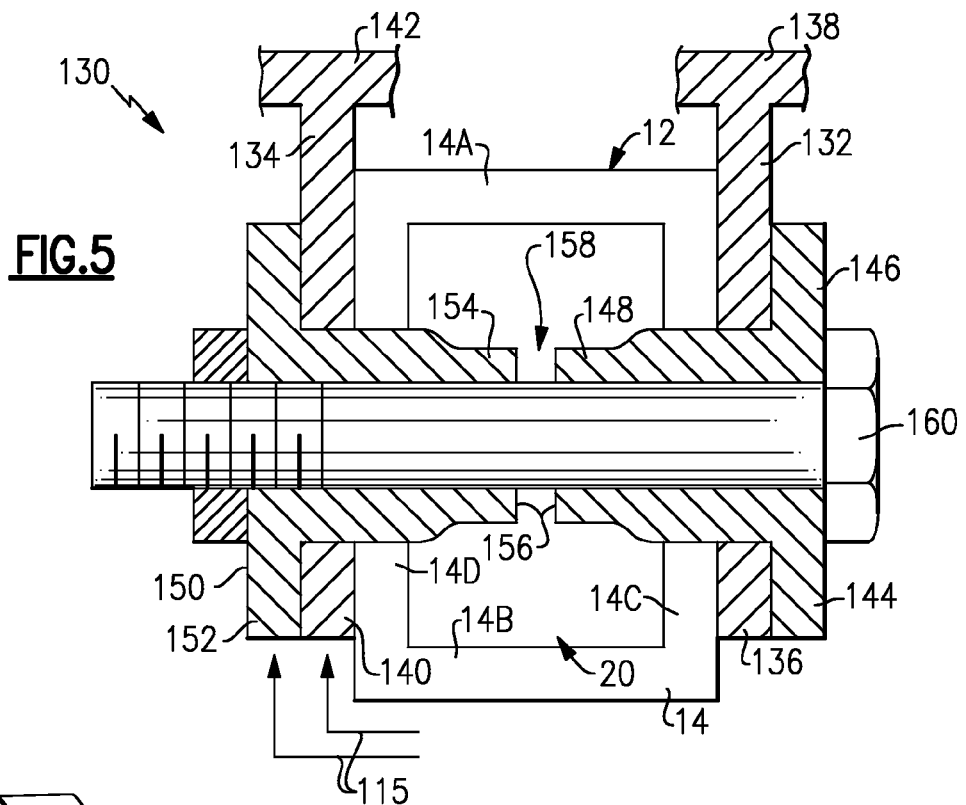
FIG. 5 is a schematic cross-sectional view of another example of a suspension mount.

FIGS. 3-5 show a similar configuration to that of FIGS. 1-2; however, the extension portions are separately formed from the axle brackets on adaptors. Thus, as discussed above, in these configurations the first suspension mount component is comprised of a first adaptor and bracket combination, and the second suspension mount component is comprised of a second adaptor and bracket combination.

As shown in FIG. 3, a suspension mount interface 80 includes a first axle bracket 82 securable to the fore wall 14C and a second axle bracket 84 securable to the aft wall 14D. The first 82 and second 84 axle brackets are cast components, which is advantageous from a cost and weight standpoint; however the brackets could be made from other processes as described above. The first axle bracket 82 includes a vertically extending pad 86 that extends along the fore wall 14C and a longitudinally extending spring pad 88 that is positioned above the top wall 14A. The second axle bracket 84 includes a vertically extending pad 90 that extends along the aft wall 14D of the tubular beam body 14 and a longitudinally extending spring pad 92 that is positioned above the top wall 14A.

A first adaptor 94 includes a first flange portion 96 and a first extension portion 98 that extends in a longitudinal direction inwardly from the first flange portion 96, through an opening in the fore wall 14C, and into the internal cavity 20. A second adaptor 100 includes a second flange portion 102 and a second extension portion 104 that extends in an opposing longitudinal direction inwardly from the second flange portion 104, through an opening in the aft wall 14D, and into the internal cavity 20. The first flange portion 96 is sandwiched directly between the vertically extending pad 86 and the fore wall 14C, and the second flange portion 102 is sandwiched directly between the vertically extending pad 90 and the aft wall 14D.

The first 98 and second 104 extension portions face each other and each include distal end surfaces 106 that are spaced apart from each other by a gap 108. The gap 108 is exaggerated for clarity purposes. The first 98 and second 104 extension portions are received within openings formed within the fore 14C and aft 14D walls in a press fit. Bearing forces (indicated at 112) are generated between the first 82 and second 84 axle brackets and the first 94 and second 100 adaptors. A tight connection of the tubular beam body 14 with the first 82 and second 84 axle brackets and/or the first 94 and second 100 adaptors is created due to the press fit.

The first 98 and second 104 extension portions include bores that are aligned to receive a fastener 110 that is inserted through the extension portions in a longitudinal direction. The bearing forces 112 are generated by a load exerted by the fastener 110 when torqued. The fastener 110 is configured similar to that of FIGS. 1-2; however, other types of fasteners could also be used. Under a free condition without a fastener torque load, the first 98 and second 104 extension portions are separated by the gap 108. Under a clamped condition, the fastener 110 clamps the first 82 and second 84 axle brackets to the tubular beam body 14 such that the distal end surfaces 106 contact each other to close the gap 108.

FIG. 4 shows the embodiment of FIG. 3 when the gap 108 is closed. FIG. 4 also shows a spring bracket 114 that is mounted to the respective first 88 and second 92 spring pads of the first 82 and second 84 axle brackets. A leaf spring 116 (FIGS. 6A-6B) rests on the spring bracket 114 and a spring top plate 118 is secured over the leaf spring 116. A plurality of straight bolts 120 extend through the spring top plate 118, into the spring bracket 114, and into the first 82 and second 84 axle brackets. This provides a tight and secure clamp joint for attaching the leaf spring 116 to the tubular beam body 14.

FIG. 5 is similar to the configuration of FIGS. 3 and 4 except that the flange portions of the adaptors are positioned outwardly of the axle brackets. As shown in FIG. 5, a suspension mount interface 130 includes a first axle bracket 132 securable to the fore wall 14C and a second axle bracket 134 securable to the aft wall 14D. The first 132 and second 134 axle brackets are cast components, which is advantageous from a cost and weight standpoint; however the brackets could be made from other processes as described above. The first axle bracket 132 includes a vertically extending pad 136 that extends along the fore wall 14C and a longitudinally extending spring pad 138 that is positioned above the top wall 14A. The second axle bracket 134 includes a vertically extending pad 140 that extends along the aft wall 14D of the tubular beam body 14 and a longitudinally extending spring pad 142 that is positioned above the top wall 14A.

A first adaptor 144 includes a first flange portion 146 and a first extension portion 148 that extends in a longitudinal direction inwardly from the first flange portion 146, through an opening in the first axle bracket 132, through an opening in the fore wall 14C, and into the internal cavity 20. A second adaptor 150 includes a second flange portion 152 and a second extension portion 154 that extends in an opposing longitudinal direction inwardly from the second flange portion 152, through an opening in the second axle bracket 134, through an opening in the aft wall 14D, and into the internal cavity 20. The first vertically extending pad 136 is sandwiched directly between the flange portion 96 and the fore wall 14C, and the second vertically extending pad 140 is sandwiched directly between the second flange portion 152 and the aft wall 14D.

The first 148 and second 154 extension portions face each other and each include end surfaces 156 that are spaced apart from each other by a gap 158. The gap 158 is exaggerated for purposes of clarity. The first 148 and second 154 extension portions are received within the openings in the fore 14C and aft 14D walls in a press fit. The first 148 and second 154 extension portions are also press-fit through the openings in the first 132 and second 134 axle brackets.

The first 148 and second 154 extension portions include bores that are aligned to receive a fastener 160. The fastener 160 is configured similar to that of FIGS. 1-4; however, other fastener configurations could also be used. The fastener 160 is inserted in a longitudinal direction into the first 148 and second 154 extension portions. Under a free condition without a fastener torque load, the first 148 and second 154 extension portions are separated by the gap 158. Under a clamped condition, the fastener 160 clamps the first 132 and second 134 axle brackets to the tubular beam body 14 such that the end surfaces 156 contact each other to close the gap 158.

The embodiment of FIGS. 3 and 4 provide higher friction forces 112 than that of FIG. 5. The embodiment of FIGS. 3 and 4 produces high friction forces between the first 82 and second 84 axle brackets and the first 94 and second 100 adaptors, as well as providing a tight connection of the tubular beam body 14 with the first 94 and second 100 adaptors. The embodiment of FIG. 5 relies mainly on the tight connection produced by the first 94 and second 100 adaptors with the tubular beam body 14 and the first 82 and second 84 axle brackets for friction forces 115.

The embodiments shown in FIGS. 1-5 provide a rigid and reliable connection capable of withstanding significant axle load inputs. Further, these configurations protect the tubular beam body 14 from excessive deformation while optimizing weight of the clamped joint.

Figure 6B:
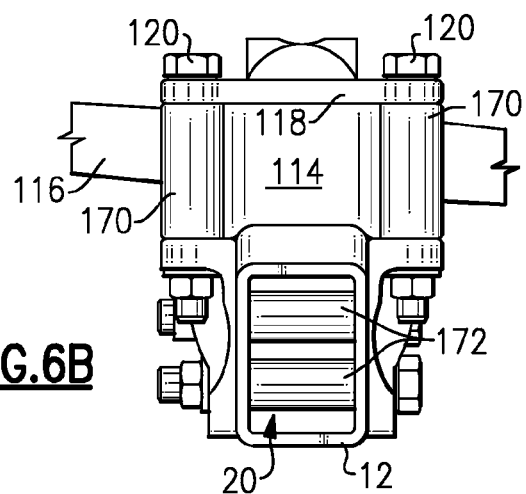
FIG. 6B is an end view of FIG. 6A.

Each of the embodiments shown above can be coupled to a leaf spring 116 as shown in FIGS. 6A and 6B. The leaf spring 116 can be a conventional steel leaf spring, or could comprise a composite leaf spring or other type of leaf spring. Further, while one leaf spring is shown, the leaf spring could comprise a plurality of leaf spring members that are stacked on top of each other in an overlapping relationship. As shown, the spring bracket 114 includes a plurality of upwardly extending bosses 170, with each boss 170 being configured to receive one straight bolt 120. The leaf spring 116 is positioned laterally between opposing pairs of bosses 170.

In this example, the leaf spring 116 comprises a lightweight composite leaf spring that is surrounded by an elastomer that is bonded to a spring bracket. The spring top plate 118 rests on top of the bosses 170, with the straight bolts 120 extending through the spring top plate 118, spring bracket 114 and axle brackets (see FIGS. 1-5). This creates a solid rigid connection when the bolts 120 are torqued to specification. The use of straight bolts 120 as opposed to U-bolts increases spring clamp forces. Further, this configuration when utilized with the features set forth in the embodiments of FIGS. 1-5, provides a robust connection to the leaf spring 116 that minimizes torque bolt relaxation. The particular spring bracket and spring top plate shown is used for a composite leaf spring so that straight bolts, rather than U-bolts, can be used; however different bracket and plate configurations could be used for U-bolt applications.

FIGS. 6A-6B also show an example where instead of using a single fastener to secure axle brackets to the tubular beam body, a pair of fasteners 172 extend through the internal cavity 20 to secure the axle brackets. The pair of fasteners 172 could be utilized instead of a single fastener in any of the embodiments disclosed above. Further, the fasteners could be orientated either vertically or longitudinally; however, longitudinal installation of the fasteners provides significant advantages for accommodating axle load inputs and increasing wear life and reliability as discussed above.

Finally, it should be understood that the term "pad" as used throughout the description could comprise leg elements as shown, or other configurations suitable for supporting a spring. For example, the pads could be comprised various shapes including rectangular, annular, etc., and could be shortened or lengthened, and/or thickened or thinned as needed.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A suspension mount for a vehicle axle comprising:
a tubular beam body enclosing a cavity, said tubular beam body having a fore side and an aft side;
a first mount component positioned adjacent said fore side;
a second mount component positioned adjacent said aft side wherein one of said first and second mount components includes a portion that extends through an opening in a wall of the tubular beam body; and
at least one fastener extending into said portion and through said cavity from said fore side to said aft side to secure said first and said second mount components to said tubular beam body.

2. A suspension mount for a vehicle axle comprising:
a tubular beam body enclosing a cavity, said tubular beam body having a fore side and an aft side;
a first mount component positioned adjacent said fore side;
a second mount component positioned adjacent said aft side; and
at least one fastener extending through said cavity from said fore side to said aft side to secure said first and said second mount components to said tubular beam body, wherein said tubular beam body extends in a lateral direction, and wherein at least one of said first and said second mount components includes an extension portion that extends in a longitudinal direction from a respective one of said fore and said aft sides of said tubular beam body into said cavity.

3. The suspension mount according to claim 2 wherein said at least one fastener is inserted along said longitudinal direction into said extension portion, and wherein said extension portion includes a distal end surface that is spaced apart from a mating engagement surface when said at least one fastener is under a first torque load condition and wherein said distal end surface is in abutting contact with said mating engagement surface when said at least one fastener is under a second torque load condition greater than said first torque load condition.

4. The suspension mount according to claim 3 wherein said extension portion extends inwardly into said cavity from one of said fore and said aft sides of said tubular beam body and wherein said mating engagement surface is associated with the other of said fore and said aft sides of said tubular beam body.

5. A suspension mount for a vehicle axle comprising:
a tubular beam body enclosing a cavity, said tubular beam body having a fore side and an aft side;
a first mount component positioned adjacent said fore side wherein said first mount component comprises a first axle bracket with a first extension portion extending into said cavity from said fore side;
a second mount component positioned adjacent said aft side wherein said second mount component comprises a second axle bracket with a second extension portion extending into said cavity from said aft side; and
at least one fastener extending through said cavity from said fore side to said aft side to secure said first and said second mount components to said tubular beam body, said at least one fastener extending through said first and said second extension portions.

6. A suspension mount for a vehicle axle comprising:
a tubular beam body enclosing a cavity, said tubular beam body having a fore side and an aft side;
a first mount component positioned adjacent said fore side wherein said first mount component comprises a first axle bracket;
a second mount component positioned adjacent said aft side wherein said second mount component comprises a second axle bracket; and
least one fastener extending through said cavity from said fore side to said aft side to secure said first and said second mount components to said tubular beam body, and wherein one of said first and said second axle brackets includes an extension portion extending into said cavity from one of said fore and said aft sides, said extension portion having a distal end surface that is spaced apart from an interior surface of a beam body wall at the other of said fore and said aft sides when said at least one fastener is under a first torque load condition, and wherein said distal end surface is in abutting contact with said interior surface when said at least one fastener is under a second torque load condition greater than said first torque load condition.

7. A suspension mount for a vehicle axle comprising:
a tubular beam body enclosing a cavity, said tubular beam body having a fore side and an aft side;
a first mount component positioned adjacent said fore side wherein said first mount component comprises a first adaptor with a first extension portion extending into said cavity from said fore side;
a second mount component positioned adjacent said aft side wherein said second mount component comprises a second adaptor with a second extension portion extending into said cavity from said aft side;
a first axle bracket associated with said first adaptor;
a second axle bracket associated with said second adaptor; and
at least one fastener extending through said cavity from said fore side to said aft side to secure said first and said second mount components to said tubular beam body, said at least one fastener extending through said first and said second axle brackets and through said first and said second extension portions to secure said first and said second axle brackets to said tubular beam body.

8. The suspension mount according to claim 6 wherein said first adaptor includes a first flange positioned outside of said cavity directly between said fore side of said tubular beam body and said first axle bracket, and wherein said second adaptor includes a second flange positioned outside of said cavity directly between said aft side of said tubular beam body and said second axle bracket.

9. The suspension mount according to claim 6 wherein said first adaptor includes a first flange positioned outside of said cavity, said first axle bracket being positioned directly between said fore side of said tubular beam body and said first flange, and wherein said second adaptor includes a second flange positioned outside of said cavity, said second axle bracket being positioned directly between said aft side of said tubular beam body and said second flange.

10. The suspension mount according to claim 1 including at least one leaf spring extendable from a first spring end to a second spring end in a fore/aft direction, and a spring bracket securable to said first and said second mount components to attach said at least one leaf spring to said tubular beam body.

11. A suspension mount for a vehicle axle comprising:
a tubular beam body enclosing a cavity, said tubular beam body having a fore side and an aft side;
a first mount component positioned adjacent said fore side;
a second mount component positioned adjacent said aft side wherein said first and said second mount components each include spring pads positioned vertically above an upper wall of said tubular beam body, and with at least one leaf spring being supported by said spring pads; and
at least one fastener extending through said cavity from said fore side to said aft side to secure said first and said second mount components to said tubular beam body.

12. The suspension mount according to claim 1 wherein said tubular beam body comprises a rectangular cross-section.

13. An axle and suspension mount assembly comprising:
a tubular axle beam extending in a lateral direction, said tubular axle beam defining a cavity that is bounded by a fore wall, an aft wall, an upper wall connecting said fore and said aft walls, and a lower wall connecting said fore and said aft walls;
a first mount component positioned adjacent said fore wall, said first mount component including a first spring pad positioned above said upper wall;
a second mount component positioned adjacent said aft wall, said second mount component including a second spring pad positioned above said upper wall, wherein said first and said second spring pads cooperate to support a spring that extends in a longitudinal direction that is transverse to said lateral direction; and
at least one fastener extending in the longitudinal direction through said cavity from said fore wall to said aft wall to secure said first and said second mount components to said tubular beam body.

14. The axle and suspension mount assembly according to claim 13 wherein said first mount component comprises a first axle bracket with a first extension portion extending in said longitudinal direction into said cavity through said fore wall, and wherein said second mount component comprises a second axle bracket with a second extension portion extending in said longitudinal direction into said cavity through said aft side, said at least one fastener extending through said first and said second extension portions.

15. The axle and suspension mount assembly according to claim 13 wherein said first mount component comprises a first axle bracket and said second mount component comprises a second axle bracket, and wherein one of said first and said second axle brackets includes a longitudinally extending extension portion extending into said cavity through one of said fore and said aft walls, said longitudinally extending extension portion having a distal end surface that is spaced apart from an interior surface of a beam body wall at the other of said fore and said aft walls when said at least one fastener is under a first torque load condition and wherein said distal end surface is in abutting contact with said interior surface when said at least one fastener is under a second torque load condition greater than said first torque load condition.

16. The axle and suspension mount assembly according to claim 13 wherein said first mount component comprises a first bracket and adaptor assembly that includes a first adaptor with a first extension portion extending into said cavity through said fore wall, and wherein said second mount component comprises a second bracket and adaptor assembly that includes a second adaptor with a second extension portion extending into said cavity through said aft wall, and wherein said first bracket and adaptor assembly includes a first axle bracket associated with said first adaptor, said first axle bracket including said first spring pad, and wherein said second bracket and adaptor assembly includes a second axle bracket associated with said second adaptor, said second axle bracket including said second spring pad, and wherein said at least one fastener extends through said first and said second axle brackets and through said first and second extension portions to secure said first and said second axle brackets to said tubular beam body.

17. The axle and suspension mount assembly according to claim 16 wherein said first adaptor includes a first flange positioned outside of said cavity directly between said fore wall of said tubular beam body and said first axle bracket and wherein said second adaptor includes a second flange positioned outside of said cavity directly between said aft wall of said tubular beam body and said second axle bracket.

18. The axle and suspension mount assembly according to claim 16 wherein said first adaptor includes a first flange positioned outside of said cavity, said first axle bracket being positioned directly between said fore wall of said tubular beam body and said first flange, and wherein said second adaptor includes a second flange positioned outside of said cavity, said second axle bracket being positioned directly between said aft wall of said tubular beam body and said second flange.

19. A method of securing a leaf spring to a vehicle axle comprising:
- attaching a first mount component to a fore side of a tubular beam body having an enclosed cavity;
- attaching a second mount component to an aft side of the tubular beam body wherein one of the first and second mount components includes a portion that extends through an opening in a wall of the tubular beam body;
- fastening at least one fastener to the first and second mount components such that the at least one fastener extends through the portion and through the enclosed cavity from the fore side to the aft side; and
- attaching a spring bracket to the first and second mount components to secure at least one leaf spring to the tubular beam body.

20. A method of securing a leaf spring to a vehicle axle comprising:
- attaching a first mount component to a fore side of a tubular beam body having an enclosed cavity;
- attaching a second mount component to an aft side of the tubular beam body;
- providing one of the first and the second mount components with an extension portion that extends through one of a fore wall and an aft wall of the tubular beam body into the cavity,
- fastening at least one fastener to the first and second mount components such that the at least one fastener extends through the enclosed cavity from the fore side to the aft side;
- spacing a distal end surface of the extension portion apart from a mating engagement surface associated with the other of the fore wall and the aft wall when the at least one fastener is under a first torque load condition;
- abutting the distal end surface against the mating engagement surface when the at least one fastener is under a second torque load condition greater than the first torque load condition; and
- attaching a spring bracket to the first and second mount components to secure at least one leaf spring to the tubular beam body.

* * * * *